Patented Sept. 10, 1940

2,214,463

UNITED STATES PATENT OFFICE 2,214,463

TREATMENT OF HYDROCARBONS

Vladimir Ipatieff and Raymond E. Schaad, Chicago, Ill., assignors to Universal Oil Products Company, Chicago, Ill., a corporation of Delaware No Drawing. Application April 30, 1937, Serial No. 139,953

10 Claims. (Cl. 260—676)

This invention relates particularly to the treatment of olefinic hydrocarbons of higher molecular weight than octenes and representing the products of the "over-polymerization" of four-carbon atom olefins.

More specifically the invention is concerned with a process for reconverting these higher molecular weight olefinic polymers into substantial yields of saturated hydrocarbons of eight-carbon atoms consisting of mixing of octanes largely of an iso character.

The polymerization of the normally gaseous olefins produced in conjunction with oil cracking processes operated with the primary object of producing gasoline from the heavier distillates and residua of petroleums may be accomplished with varying degrees of efficiency either by strictly thermal or by catalytic methods although as a rule the use of catalysts permits the employment of less severe conditions of operation in respect to temperature and pressure, while at the same time giving liquid products of a more olefinic character free from compounds produced by secondary reactions. However, in both types of processes there is a limit to the selectivity of the polymerizing reactions which are accompanied to a greater or lesser extent by decomposition of the hydrocarbons involved to form on the one hand low boiling liquid and gaseous products and on the other hand higher boiling materials than those desired as a principal product of the process which is usually a high octane number blending material having properties closely approximating that of the well-known iso-octane designated structurally as 2,2,4-trimethyl pentane.

In a more limited sense the petroleum industry is concerned with the conversion of propene and butenes into liquid polymers, these compounds being roughly designated as the "higher" olefins. The production of practical yields of hydrocarbon liquids from ethylene either by thermal or catalytic methods is difficult and the usual operations of polymerization are conducted upon the so-called propane-butane fractions produced as overhead from the stabilizers operating upon primary cracked distillates. A still more limited type of operation employs the so-called butane-butene or "B-B" fractions which consist of butanes and butenes in varying proportions, the object of these processes being to produce maximum yields of octenes which can be readily hydrogenated to the corresponding octanes which in turn are very desirable as high antiknock aviation fuel having substantially no gumming tendencies.

In the catalytic polymerization of butenes to produce maximum yields of their dimers, commercial success has attended the use of a type of catalyst which is known to the trade as "solid phosphoric acid catalyst" and which is produced by the general steps of (1) Making a pasty mixture of either ortho or pyrophosphoric acid and a finely divided siliceous adsorbent such as kieselguhr;

(2) Heating the initially formed pasty material to temperatures as high as 400° C. to produce a solid cake partly by evaporation of some of the combined water in the acids and partly by the formation of silico-phosphoric acid complexes;

(3) Grinding and sizing the cake to produce particles of convenient diameter of the order of 4 to 20 mesh; and (4) Treating the granules with steam at temperatures of approximately 250–275° C. to produce a material having a degree of hydration corresponding to maximum olefin polymerizing effectiveness. By the use of such catalytic materials it has been found possible in the case of butenes to produce liquid products consisting of 75–90% octenes, the remainder of the liquid consisting of higher boiling polymers which are mainly dodecenes corresponding to the trimers of the butenes and hexadecenes corresponding to their tetramers, and it is with the further treatment of these higher butene polymers that the present invention is concerned.

In one specific embodiment the present invention comprises the hydrogenation of liquid olefin hydrocarbons consisting of trimers and tetramers of butenes under conditions conducive to the direct formation of substantial yields of octanes.

We have found that it is possible to convert the mixtures of butene trimers and tetramers representing the heavier products of butene polymerization directly into octanes by catalytic hydrogenation, thus accomplishing in one step a controlled depolymerization and hydrogenation. A variety of catalysts may be employed in this destructive hydrogenating operation including such catalysts as nickel, nickel oxide, nickel thiomolybdate, corresponding compounds of cobalt, oxides and sulfides of the metals in the left-hand column of group 6 of the periodic table including chromium, molybdenum, and tungsten, and various other catalysts of varying effectiveness. Such catalysts may be employed as such in finely divided condition or may be distributed upon relatively inert supports such as kieselguhr, fuller's earth, activated alumina, etc.

The actual type of operation which is effective in producing the lower boiling saturated paraffins from the higher polymers will depend somewhat upon the activity of the catalyst employed. In the case of the more active catalysts such as nickel oxide and reduced nickel, the desired reactions may be brought about by passing the heavy polymer vapors mixed with a suitable excess of hydrogen over the catalyst in granular form preferably distributed upon an inert carrier at atmospheric or only slightly superatmospheric pressure and at moderate temperatures of the order of 250–300° C. With the less active catalyst, which, however, may at times be more practical on account of their greater resistance to poisoning influences, the best type of operation may be the use of considerably superatmospheric pressures corresponding to substantially liquid phase and considerably longer time factors. In any event even when employing liquid phase and high pressures, operations may be made continuous by pumping the mixture of hydrogen and liquid hydrocarbons through granular catalyst beds or forcing a suspension of finely divided catalyst in the hydrocarbons through tubular heating elements along with a sufficient excess of hydrogen.

The process is not limited to any set of operating details which may be employed in practice nor any particular type of apparatus but apparently depends for its successful operation upon the use of the particular temperature range specified along with proper pressures and times of contact suitable to different hydrogenating catalysts.

The following examples are given to indicate the general character of the results obtainable by the use of the process although not with the object of limiting the scope of the invention in exact correspondence therewith.

*Example I*

A fraction of butene polymers boiling within the range of 170–180° C. and consisting principally of various trimers was placed in a rotating autoclave containing an amount of finely divided nickel oxide equal to 10% by weight of the olefin. The bomb was sealed and hydrogen was introduced until a pressure of 100 atmospheres was reached and was then heated at a temperature of 300° C. for a period of 11 hours, the autoclave being rotated at a sufficient rate to insure good contact between catalyst, the liquid hydrocarbon, and the hydrogen atmosphere.

After cooling the autoclave and reducing the pressure by withdrawing the uncondensed gases it was found that the liquid products consisted of 40% of a mixture of octanes showing an octane number of 99 on a standard test engine and 38% by volume of dodecanes showing an octane number of approximately 95 by the same method. The remaining 22% of the weight of the tri-isobutene introduced consisted of isobutane which after separation from the excess hydrogen could be catalytically dehydrogenated and repolymerized to go through the same cycle as the original material which produced the tri-isobutene. It is to be noted that the octanes produced had the same octane number as the mixture produced by the direct non-destructive hydrogenation of the dimers of isobutene.

*Example II*

A polymer fraction boiling within the range of 120–200° C. and representing a mixture of the fractions boiling above octenes resulting from the mixed polymerization of iso and n-butenes using solid phosphoric acid catalysts under critical phase conditions of operation was hydrogenated in a rotating autoclave for 15½ hours at 290° C. in the presence of 10% by weight of nickel thiomolybdate. The initial hydrogen pressure was again 100 atmospheres as in Example I.

As a result of the above operation the higher boiling polymers were converted into a mixture of saturated paraffin hydrocarbons, 50% of which boiled within the approximate range of 30–120° C. and had an octane number of 92. The higher boiling fractions representing 38% of the charged polymer were also saturated and showed an octane number of 86 when tested in the standard engine. The remaining 12% of the reaction products consisted of a gas having a high percentage of isobutane, along with a small amount of higher boiling residues.

*Example III*

In this case a liquid hydrocarbon mixture consisting principally of tri-isobutene was vaporized, mixed with a considerable molal excess of hydrogen and passed at substantially atmospheric pressure over an active catalyst consisting of reduced nickel on kieselguhr. The following tabulation shows the results obtained when operating under varying conditions of temperature in a continuous run.

|  | Period No. | | | | |
|---|---|---|---|---|---|
|  | 1 | 2 | 3 | 4 | 5 |
| Temperature, °C | 302 | 304 | 276 | 255 | 255 |
| Hours | 25 | 23 | 22 | 19 | 48 |
| $H_2:C_{12}H_{24}$ | 4.3 | 3.9 | 4.5 | 4.8 | 4.4 |
| Products, percent by weight of (tri-isobutene charged): | | | | | |
| $CH_4$ |  | 27.4 | 7.9 | 3.9 | 2.7 |
| $C_4$ fraction | 30.5 | 26.7 | 23.5 | 19.0 | 11.1 |
| IBP—125° C. (octanes) | 28.4 | 30.6 | 43.7 | 41.2 | 27.3 |
| 125–185 | 8.8 | 10.8 | 17.8 | 32.1 | 52.1 |
| Total recovery |  | 95.5 | 92.9 | 96.2 | 92.2 |
| Loss and bottoms |  | 4.5 | 7.1 | 3.8 | 7.8 |

It is evident from the above data that the substantial conversion of the tri-isobutene into octanes was accomplished at temperatures from approximately 275–255° C. in Periods #3 and #4. By recycling the heavier material boiling above 125° C., further conversion was made possible so that ultimately about 65% of the tri-isobutene charge was recovered as octanes.

The nature of the present invention can be seen from the foregoing descriptive and numerical sections although neither is intended to be unduly limiting.

We claim as our invention:

1. In the polymerization of butenes wherein there are formed trimer and tetramer polymers of butene, the improvement which comprises subjecting said polymers to destructive hydrogenation under conditions conducive to the direct formation of octanes therefrom.

2. A process for obtaining more valuable products from a mixture of butene trimers and tetramers, which comprises subjecting the mixture to destructive hydrogenation under conditions conducive to the formation of octanes by depolymerization and hydrogenation of said trimers and tetramers.

3. A process for the direct production of octanes from a mixture of butene trimers and tetramers which comprises subjecting said mixture to destructive hydrogenation at a temperature of about 250–300° C. in the presence of a hydrogenating catalyst.

4. A process for the direct production of octanes from a mixture of butene trimers and tetramers, which comprises subjecting said mixture to destructive hydrogenation at a temperature of about 250–300° C. in the presence of a nickel catalyst.

5. A process for the direct production of octanes from a mixture of butene trimers and tetramers, which comprises subjecting said mixture to destructive hydrogenation at a temperature of about 250–300° C. in the presence of nickel oxide.

6. A process for the direct production of octanes from a mixture of butene trimers and tetramers, which comprises subjecting said mixture to destructive hydrogenation at a temperature of about 250–300° C., in the presence of reduced nickel.

7. A process for obtaining more valuable products from butene trimers which comprises subjecting said trimers to destructive hydrogenation under conditions conducive to the formation of octanes by depolymerization and hydrogenation of the trimers.

8. A process for obtaining more valuable products from butene tetramers which comprises subjecting said tetramers to destructive hydrogenation under conditions conducive to the formation of octanes by depolymerization and hydrogenation of the tetramers.

9. A process for the direct production of octanes from butene trimers which comprises subjecting said trimers to destructive hydrogenation at a temperature of about 250–300° C. in the presence of a hydrogenating catalyst.

10. A process for the direct production of octanes from butene tetramers which comprises subjecting said tetramers to destructive hydrogenation at a temperature of about 250–300° C. in the presence of a hydrogenating catalyst.

VLADIMIR IPATIEFF.
RAYMOND E. SCHAAD.